US010683604B2

(12) United States Patent
Gérard

(10) Patent No.: US 10,683,604 B2
(45) Date of Patent: Jun. 16, 2020

(54) DRYER, PARTICULARLY FOR DRYING CLEAN-ROOM GARMENTS AND ACCESSORIES

(71) Applicant: MANOHA, Beloeil (BE)

(72) Inventor: Patrick Gérard, Arbre (BE)

(73) Assignee: MANOHA, Beloeil (BE)

( * ) Notice: Subject to any disclaimer, the term of this patent is extended or adjusted under 35 U.S.C. 154(b) by 127 days.

(21) Appl. No.: 15/757,625

(22) PCT Filed: Sep. 9, 2016

(86) PCT No.: PCT/EP2016/071323
§ 371 (c)(1),
(2) Date: Mar. 5, 2018

(87) PCT Pub. No.: WO2017/042343
PCT Pub. Date: Mar. 16, 2017

(65) Prior Publication Data
US 2018/0245270 A1 Aug. 30, 2018

(30) Foreign Application Priority Data
Sep. 11, 2015 (BE) .................................. 2015/5568

(51) Int. Cl.
*D06F 58/22* (2006.01)
*D06F 39/08* (2006.01)
(Continued)

(52) U.S. Cl.
CPC ............. *D06F 58/22* (2013.01); *B01D 46/10* (2013.01); *B01D 46/442* (2013.01);
(Continued)

(58) Field of Classification Search
CPC ........ D06F 58/22; D06F 39/082; D06F 39/10; D06F 2058/2858; D06F 58/02;
(Continued)

(56) References Cited

U.S. PATENT DOCUMENTS 2,315,354 A * 3/1943 Shanman ................ D06F 58/22
34/82
3,614,421 A 10/1971 Alter et al.
(Continued)

FOREIGN PATENT DOCUMENTS

EP 2 196 250 A2 6/2010
JP S58-210819 A 12/1983
JP H08-136437 A 5/1996

OTHER PUBLICATIONS

International Search Report dated Nov. 3, 2016, issued in corresponding International Application No. PCT/EP2016/071323, filed Sep. 9, 2016, 3 pages.
(Continued)

*Primary Examiner* — Edelmira Bosques
*Assistant Examiner* — Bao D Nguyen
(74) *Attorney, Agent, or Firm* — Christensen O'Connor Johnson and Kindness, PLLC

(57) ABSTRACT

A dryer, particularly for drying clean-room garments and accessories, includes a dryer body, a drying chamber, and a system for circulating air between an air intake and the drying chamber. The system includes an air aspiration device giving a direction of air flow from the air intake towards the drying chamber, a device for heating the aspirated air placed upstream of said drying chamber, and an absolute filter provided upstream of the drying chamber. The dryer further includes, upstream of the absolute filter, a connector arranged so as to be connected to a device for supplying air charged with a predetermined quantity of droplets of an aerosol, and in that it has an access to a space located downstream of the absolute filter and upstream of the drying chamber, the access to a space being arranged so as to be able to receive a measuring device.

9 Claims, 2 Drawing Sheets

(51) Int. Cl.

| | | |
|---|---|---|
| *D06F 39/10* | (2006.01) | |
| *G01M 3/20* | (2006.01) | |
| *B01D 46/10* | (2006.01) | |
| *B01D 46/44* | (2006.01) | |
| *D06F 58/50* | (2020.01) | |

(52) U.S. Cl.
CPC ............ *D06F 39/082* (2013.01); *D06F 39/10* (2013.01); *G01M 3/20* (2013.01); *B01D 2273/18* (2013.01); *D06F 58/50* (2020.02)

(58) Field of Classification Search
CPC .. B01D 46/442; B01D 46/10; B01D 2273/18; G01M 3/20
USPC ............................................................ 34/82
See application file for complete search history.

(56) References Cited

U.S. PATENT DOCUMENTS

| | | |
|---|---|---|
| 3,765,225 A | 10/1973 | Rivers |
| 4,055,075 A | 10/1977 | Alan et al. |
| 2003/0126691 A1 | 7/2003 | Gerlach et al. |
| 2006/0053864 A1* | 3/2006 | Morse ................ B01D 46/0086 73/23.2 |
| 2007/0044438 A1* | 3/2007 | Morse ................ B01D 46/0091 55/342 |
| 2012/0017457 A1 | 1/2012 | Bae et al. |

OTHER PUBLICATIONS

Written Opinion dated Nov. 3, 2016, issued in corresponding International Application No. PCT/EP2016/071323, filed Sep. 9, 2016, 6 pages.

* cited by examiner

DRYER, PARTICULARLY FOR DRYING CLEAN-ROOM GARMENTS AND ACCESSORIES

The present invention relates to a dryer, particularly for drying clean-room garments and accessories, comprising:
- a dryer body;
- a drying chamber;
- a system for circulating air between an air intake and said drying chamber, this system comprising:
  - an air aspiration device giving a direction of air flow from the air intake towards said drying chamber;
  - a device for heating the aspirated air placed upstream of said drying chamber; and
  - an absolute filter placed upstream of said drying chamber.

A dryer of this kind is known from the prior art and can for example be used to dry garments or accessories (safety glasses, shoes, etc.) for clean-rooms or for any other field of activity. In the methods for cleaning and conditioning clean-room garments or accessories, passing these items through a dryer is crucial in that their decontamination is substantially performed at this stage. This is because the garments or accessories are subjected to temperatures in the range of from 0° C. to 120° C. in the drying chamber of the dryer, which allows the removal not only of any unwanted particles that may be clinging to said garments or accessories but also, as a result of the temperature, of bacteria or other contaminants that may have withstood the previous stages of cleaning.

As used within the meaning of the present invention, the words "drying chamber" can denote a rotary drum, a basket, a drawer or any other device capable of holding laundry and/or accessories (safety glasses, shoes, etc.) and/or any other element to be dried for clean-room use or otherwise. When the drying chamber takes the form of a rotary drum or of a basket inserted into the dryer, the dryer will be provided with a door (for example with a porthole door). However, when the drying chamber takes the form of one or more drawers, the drawer or drawers can themselves act as a door.

When the dryer is used to dry clean-room garments or accessories, it will be essential for it to be located in a room that meets rigorous standards in terms of the presence of particles in the air since the processing of clean-room garments or accessories must ensure that these items will be free from any contaminant so that they are not sources of contamination, for example contamination of a surrounding environment such as an operating room. To that end, because there is powerful turbulence in the dryer and because various contaminants are extracted in this way from garments or accessories for clean-room or other use, it is necessary to prevent these particles from reaching the room for conditioning clean-room garments during the drying stage. For this reason, conventionally, the drying chamber of the dryer must be at a lower pressure relative to the pressure prevailing in the environment outside the dryer. This ensures that the particles coming from the garments or accessories and present in drying air within the drying chamber do not reach and do not contaminate the ambient air outside the dryer.

It is obvious that an essential parameter during the step of drying the garments or accessories for clean-room or other use is the quality of the air entering the drying chamber of the dryer. This is because it is necessary that air that is as clean as possible, that is to say that air free from particles, reaches the drying chamber. For this reason, dryers are conventionally provided with an absolute filter (a high efficiency filter) through which air aspirated from a surrounding environment passes before reaching the drying chamber. Within the scope of the present invention, a grade H13 filter compliant with the European standard EN1822 having a filtration efficiency of 99.95% or a higher grade of filter (H14, U15, U16, U17) is preferably used, so that air deemed to be particle-free reaches the drying chamber.

The absolute filter is therefore a determining element as regards the quality of the drying and truly determines the degree of decontamination, during the cleaning process, of the garments or accessories for clean-room or other use. For this reason, from time to time, it is necessary to check the efficiency and the integrity of absolute filters in order to ensure that they do not have any cracks or leaks, in which case contaminants could reach the drying chamber. Conventionally, the integrity of filters is measured and assessed by performing a test using aerosol droplets of dioctyl phthalate (DOP) (DOP test). This test allows the efficiency and integrity of a filter to be measured in terms of the retention of particles present in the air, on the basis of the retention of DOP droplets calibrated for example to 0.3 µm in accordance with the ASTM D 2986-71 method. As an example, if retention of 99.97% of DOP droplets (particles) is seen using this method, the filter is then described as a high efficiency (HEPA) filter.

More particularly, the DOP tests rely on the production of an aerosol upstream of a filter to be tested, the aim of this production being to saturate the upstream (upper) face of the filter. In order to detect leaks and/or cracks, a measuring device (for example a photometer) is used to scan the downstream lower face of the filter and measure the quantity of DOP particles (droplets) that succeed in passing through the absolute filter. We note that DOP is gradually being replaced by dioctyl sebacate (DEHS), the method for measuring the integrity of the filters remaining identical.

Unfortunately, although current laundry dryers or dryers for accessories for clean-room or other use include an absolute filter that allows air free from particles or containing very few particles to reach the drying chamber, it is necessary, as indicated above, to check the integrity of the filter from time to time to ensure that it does not have any leaks and/or cracks through which contaminant particles could pass. However, with current dryers, such a check is particularly onerous since it is necessary to disassemble the dryer at least partially in order to remove the absolute filter therefrom and then orient the filter towards a special separate enclosure where its integrity can be tested. As the absolute filter is generally positioned beneath a device for heating the air entering in the dryer (heater battery), gaining access to it is complicated and the risk of damaging the filter while it is being removed is not insignificant.

Furthermore, testing the integrity of the filter in a special enclosure provided for that purpose does not allow in situ checking that the filter is properly positioned in the dryer, since current methodologies for testing filter integrity rely on taking the filter out of the dryer. However, this is as important as checking that the filter does not have any cracks and/or leaks because poor positioning of the filter could allow contaminant particles to pass through, for example at the edges of the filter if said filter is not correctly positioned and fixed to a receiving frame in the body of the dryer (insufficient or excessive clamping, crushing of any gasket, deformation of the casing in which the receiving frame is fitted, etc.).

Furthermore, since it is particularly onerous to remove the filter, measures for checking the integrity and efficiency thereof are performed only rarely and often much too late. Consequently, leaks and/or cracks may be present but detected only subsequently, which means garments and/or accessories, for example cleanroom garments, are not necessarily optimally dried, as contaminant particles can reach the drying chamber.

The aim of the invention is to overcome the disadvantages of the prior art by obtaining a dryer of which the integrity of the absolute filter can be tested in situ in such a way that it is possible to determine simultaneously the presence of cracks and/or leaks and potential incorrect positioning of the filter in the body of the dryer, this being effected without having to remove the filter so as to prevent any damage to said filter and any onerous and time-consuming handling thereof.

In order to achieve this aim, according to the present invention, a dryer is provided as indicated at the beginning, characterized in that it further comprises, upstream of said absolute filter, a connector arranged to be connected to a device for supplying air charged with a predetermined quantity of droplets of an aerosol and in that it comprises an access to a space located downstream of said absolute filter and upstream of said drying chamber, said access to a space being arranged so as to be able to receive a measuring device.

The words "a connector arranged to be connected to a device for supplying air charged with a predetermined quantity of droplets of an aerosol" mean, within the meaning of the present invention, that the dryer comprises a connector but that the connector is not necessarily connected to a device for supplying air charged with a predetermined quantity of droplets of an aerosol. In other words, the connector according to the invention is capable of being connected to a device for supplying air charged with a predetermined quantity of droplets of an aerosol.

Moreover, as used within the meaning of the present invention, the word "connector" denotes any element or any zone of the dryer allowing a device for supplying air charged with a predetermined quantity of droplets of an aerosol to be linked (coupled, connected, joined) thereto. It may for example be an end piece in the form of a pipe to which the air supply device can be fitted (preferably in a sealed manner) or simply an empty space (an opening) into which the air supply device can be inserted (preferably in a sealed manner). Of course, any other element, any other opening or any other means of any form capable of serving as a connector also falls within the scope of the present invention.

According to the invention, since the dryer for laundry or accessories (safety glasses, shoes, etc.) has, upstream of the absolute filter, a connector arranged to be connected to a device for supplying air charged with a predetermined quantity of droplets of an aerosol and an access to a space located downstream of the absolute filter, it is quite possible to perform a DOP-type test without having to manipulate the filter, that is to say, without having to remove it from the dryer, by supplying air via the connector towards and through the filter and by scanning the lower face of said filter with a device for measuring DOP particles not retained by the filter. Thus, according to the invention, it is necessary merely to connect said connector to a device for supplying air, which air is charged with a predetermined quantity of DOP-type aerosol droplets. For example, the DOP aerosol could be injected into the supplied air before it arrives at said connector.

It is therefore particularly easy to regularly perform a DOP test that does not require removal of the filter, which is particularly advantageous because the filter remains positioned in situ in the dryer and because it is therefore possible, at the same time as detecting leaks and/or cracks, to ensure that the filter is correctly positioned (sufficient clamping, no crushing of any gasket, etc.), this being carried out substantially along its edges.

Preferably, according to the invention, said space located downstream of said absolute filter extends beneath the whole of said absolute filter. In particular, this allows a scan of the whole of the lower face of the filter to be performed and therefore allows the zones of the filter that could be responsible for the passage of contaminant particles to be scanned, for example the zones at the edge of the filter that might not provide a proper seal of said filter when it is placed in the body of the dryer (for example on a mounting frame).

Advantageously, according to the invention, said access to a space located downstream of said absolute filter is located behind a first hatch.

Preferably, according to the invention, said connector upstream of said absolute filter is located behind a second hatch.

Advantageously, according to the invention, said first hatch comprises at least one sealing means allowing a sealed closure thereof to be provided.

Preferably, according to the invention, said second hatch comprises at least one sealing means allowing a sealed closure thereof to be provided.

When the dryer is in operation, it is necessary, as previously mentioned, to prevent particles (contaminants) from reaching the drying chamber. It is therefore preferable for the connector and the access to the space located downstream of the absolute filter to be closed (obturated), which is ensured by the presence of hatches. Furthermore, since the first and second hatches provide access to spaces located below and above the filter, respectively, it is preferable for them to be provided with sealing means that can for example take the form of a gasket which provides this seal by means of compression.

Preferably, according to the invention, said absolute filter is an absolute filter having high or very high integrity, for example an EPA, HEPA or ULPA filter.

Preferably, the dryer according to the invention further comprises a device for supplying air charged with a predetermined quantity of droplets of an aerosol, said device being connected to said connector.

According to this embodiment of the invention, an air supply device is coupled (connected) to the connector and forms an integral part of the dryer according to the invention. Rather than requiring an air supply device to be connected to the dryer each time, a dryer of this kind provides a system (dryer) that is already ready for DOP-type tests to be performed. This further encourages the frequent performance of DOP-type tests because the filter does not have to be removed, but in addition, the air supply device is already properly connected to the dryer.

The accompanying claims relate to other embodiments of a dryer according to the invention.

The present invention also relates to a use of a dryer according to the invention for carrying out a measurement of the integrity of said absolute filter.

The accompanying claims relate to other embodiments of a dryer according to the invention.

The present invention further relates to a method for measuring the integrity of an absolute filter of a dryer, said method comprising the following steps:

supplying air charged with a predetermined quantity of droplets of an aerosol by means of a connector located upstream of said absolute filter, and measuring, with a measuring device, in a space located downstream of said absolute filter, a quantity of droplets of said aerosol that have passed through said absolute filter.

This method allows tests of the integrity and efficiency of the filter (for example a DOP test) to be performed easily, without removing the filter and taking it out of the dryer. This is because, according to the invention, only one supply of air charged with a predetermined quantity of droplets of an aerosol through the filter has to be provided and be followed by a measurement, downstream of said filter, of the quantity of droplets (particles) that succeeded in passing through the filter. Once again, as this method is simple and quick, it allows tests to check the integrity and efficiency of the filters, for example DOP-type tests, to be performed regularly and without constraint.

Advantageously, according to the invention, said step of supplying air charged with a predetermined quantity of droplets of an aerosol is based on the supply of air charged with droplets of dioctyl phtalate or dioctyl sebacate.

Other features, details and advantages of the invention will become apparent from the description that follows, given by way of non-limiting example and with reference to the accompanying drawings.

Figure 1:
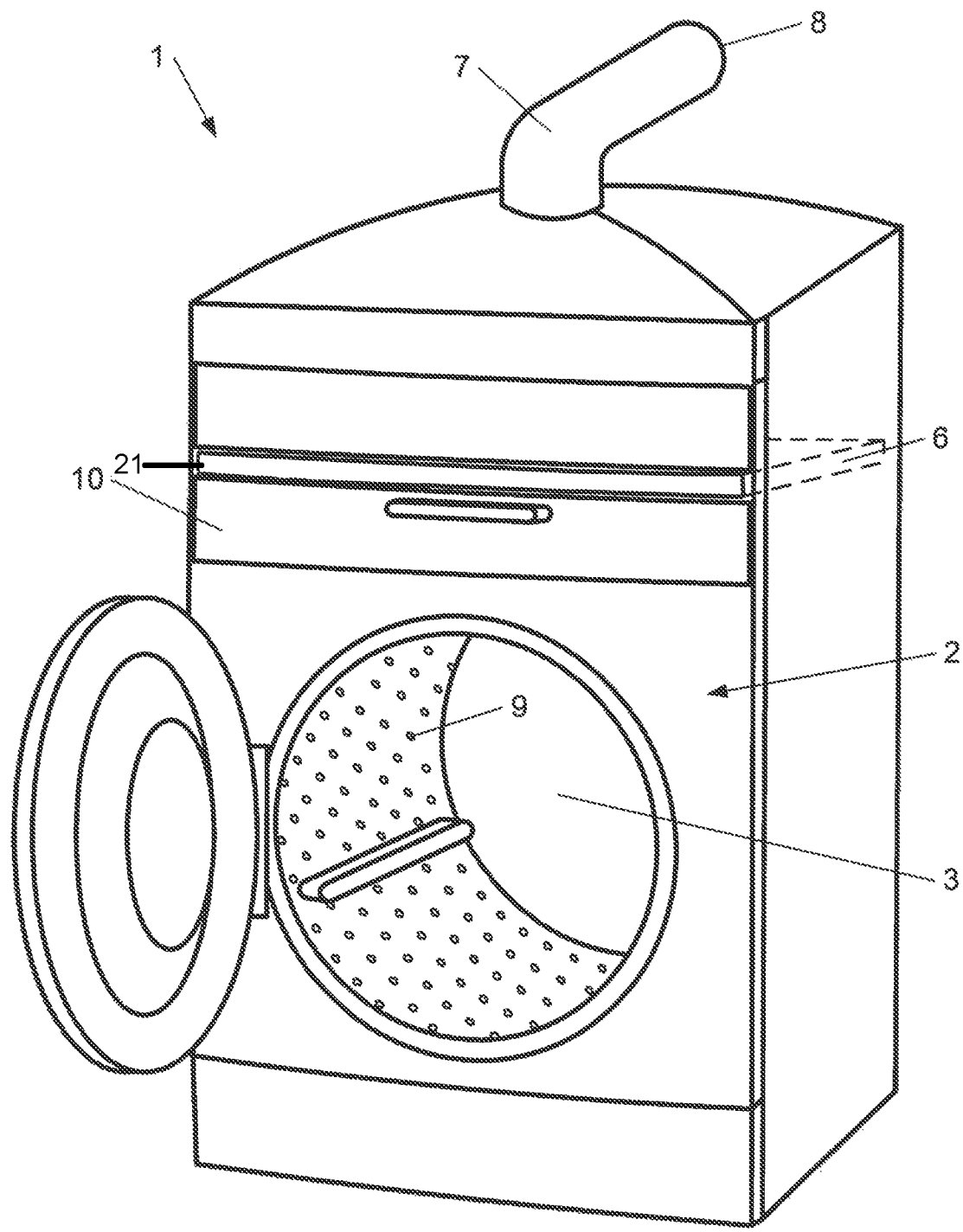
FIG. 1 is a schematic view of a dryer for laundry and/or accessories according to the invention.

In the drawings, elements that are identical or similar have the same references.

Figure 2:
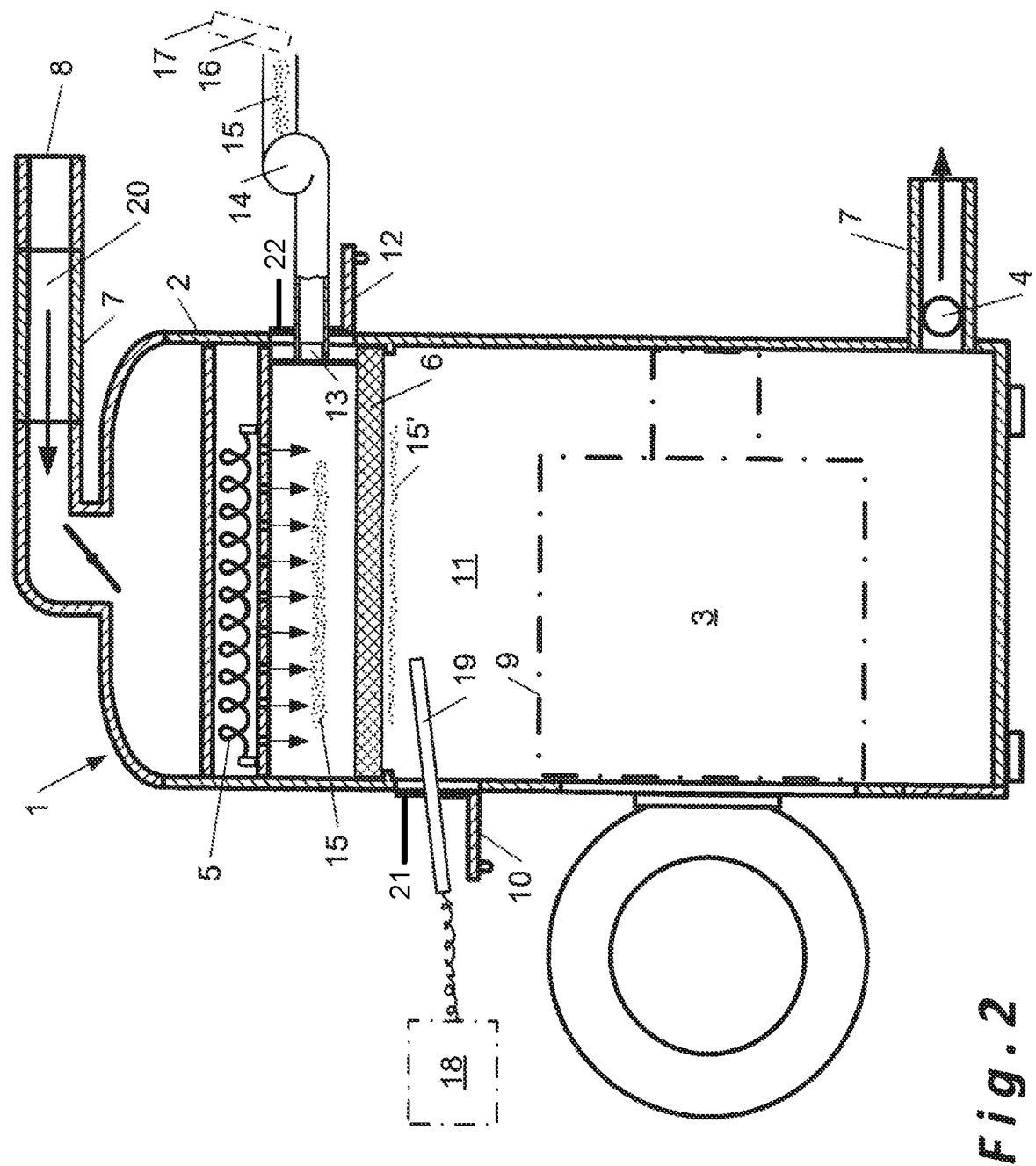
FIG. 2 is a side view of a dryer for laundry and/or accessories according to the invention.

FIG. 1 shows a dryer 1 according to the invention. This dryer 1 has a dryer body 2, a rotary drum corresponding to a drying chamber 3 and is arranged to be driven by a motor, an air circulation system 7 comprising a device 4 (not shown) for the aspiration of external air from a surrounding environment through an air intake 8, a heating device 5 (not shown) arranged to heat the aspirated external air before it reaches the drying chamber 3 and an absolute filter 6 having an upper face and a lower face. As illustrated, the drying chamber 3 is provided with air intake openings 9 so that the aspirated and heated air can reach said drying chamber 3. In addition, according to the invention, the dryer 1 comprises, on the outer wall, a first hatch 10 for access to a space 11 located beneath the lower face of the absolute filter 6 and, at the rear of the dryer 1, a second hatch 12 (not shown) for access to a connector 13 (not shown) located above the upper face of said absolute filter 6, this connector 13 being arranged to be coupled to a device 14 (not shown) for supplying air charged with a predetermined quantity of droplets 15 of an aerosol 16, for example droplets of DOP or DEHS. As shown in FIG. 2, the first hatch 10 comprises at least one sealing means 21 allowing a sealed closure thereof to be provided, and the second hatch 12 comprises a at least one sealing means or sealing means 22 allowing a sealed closure thereof.

FIG. 2 is a side view of a dryer 1 according to the invention. As illustrated, during the performance of a DOP-type test, the second hatch 12 (located at the rear of the dryer) for access to a connector 13 is open to allow a device 14 for supplying air charged with a predetermined quantity of droplets 15 of an aerosol 16 to be connected towards the upper face of the absolute filter 6 so that this air charged with a predetermined quantity of droplets 15 of an aerosol 16 (DOP) passes through the absolute filter 6. For example, the aerosol 16 is injected with the aid of an injection device 17 into the flow of supplied air so that the supplied air is charged with droplets 15 of the aerosol 16.

During the performance of this same DOP test, the first hatch 10 for access to a space 11 located beneath the lower face of the absolute filter 6 is also open to allow a probe 19 of a measuring device 18 (for example a photometer) to be slid into the space 11 located beneath the lower face of the absolute filter 6. In this way, by moving the probe 19 beneath the entire surface of the absolute filter 6, the quantity of droplets 15' of the aerosol 16 that has been able to pass through the absolute filter 6 can easily be measured. This allows the presence of any cracks and/or leaks in the filter to be detected, a presence which is manifested by a detection and a measurement of a quantity of droplets higher than a predetermined threshold that has reached the space 11 beneath the absolute filter 6. This also makes it possible to determine, when the probe 19 scans the edges of the absolute filter 6, whether said filter is positioned correctly in the body 2 of the dryer, i.e. whether said filter is placed in a sealed manner in order not to allow contaminant particles to pass through. A pre-filter 20 is optionally provided at the air intake 8.

Of course, the present invention is not in any way restricted to the embodiments described above and that several modifications may be made thereto without departing from the scope of the accompanying claims.

The invention claimed is:

1. A dryer for drying clean-room garments and accessories, comprising:
   a dryer body;
   a drying chamber;
   a system for circulating air between an air intake and said drying chamber, said system comprising:
   an air aspiration device giving a direction of air flow from the air intake towards said drying chamber;
   a device for heating the aspirated air placed upstream of said drying chamber; and
   an absolute filter provided upstream of said drying chamber,
   wherein said dryer further comprises, upstream of said absolute filter, a connector arranged so as to be connected to a device for supplying air charged with a predetermined quantity of droplets of an aerosol, and wherein the dryer has an access to a space located downstream of said absolute filter and upstream of said drying chamber, said access to the space being arranged so as to be able to receive a measuring device.

2. The dryer according to claim 1, wherein said space located downstream of said absolute filter extends beneath the whole of said absolute filter.

3. The dryer according to claim 1, wherein said access to the space located downstream of said absolute filter is located behind a first hatch.

4. The dryer according to claim 3, wherein said first hatch comprises at least one sealing means for sealingly closing said first hatch.

5. The dryer according to claim 1, wherein said connector upstream of said absolute filter is located behind a second hatch.

6. The dryer according to claim 5, wherein said second hatch comprises at least one sealing for sealingly closing said second hatch.

7. The dryer according to claim 1, characterized in that wherein said absolute filter is an absolute filter with high or very high efficiency, the absolute filter being an EPA, HEPA or ULPA filter.

8. The dryer according to claim 1, a wherein said device for supplying air charged with the predetermined quantity of droplets of the aerosol is connected to said connector.

9. A method, comprising:
using the dryer according to claim 1 to measure an integrity of said absolute filter.

\* \* \* \* \*